US007568664B2

(12) United States Patent
Mitchell

(10) Patent No.: US 7,568,664 B2
(45) Date of Patent: Aug. 4, 2009

(54) HANDS FREE PIPE HOLDER

(76) Inventor: Mark Mitchell, 904 S. Cornwall Dr., Anaheim, CA (US) 92804

( * ) Notice: Subject to any disclaimer, the term of this patent is extended or adjusted under 35 U.S.C. 154(b) by 183 days.

(21) Appl. No.: 11/174,078

(22) Filed: Jul. 1, 2005

(65) Prior Publication Data

US 2007/0001061 A1 Jan. 4, 2007

(51) Int. Cl.
*F16L 3/00* (2006.01)

(52) U.S. Cl. ............................ 248/49; 248/80; 254/30; 269/287

(58) Field of Classification Search .................. 248/49, 248/80, 351, 538, 75, 87, 520; 269/287, 269/296, 133; 254/30
See application file for complete search history.

(56) References Cited

U.S. PATENT DOCUMENTS

| | | | | | |
|---|---|---|---|---|---|
| 2,614,779 | A | * | 10/1952 | Peterson et al. | 248/117.2 |
| 2,709,384 | A | * | 5/1955 | Harris | 269/251 |
| 2,888,220 | A | * | 5/1959 | Rose | 248/538 |
| 3,603,539 | A | * | 9/1971 | Clegg, Jr. | 248/79 |
| 4,089,469 | A | * | 5/1978 | Greig | 239/754 |
| 4,093,170 | A | * | 6/1978 | Spray | 248/688 |
| 4,194,711 | A | * | 3/1980 | Winton | 248/49 |
| 4,258,907 | A | * | 3/1981 | Roberts et al. | 269/69 |
| 5,092,571 | A | * | 3/1992 | Stevens | 269/296 |
| 5,143,175 | A | * | 9/1992 | Tomko | 182/181.1 |
| 5,829,142 | A | | 11/1998 | Rieser | 30/93 |
| 5,845,891 | A | * | 12/1998 | West | 248/538 |
| 5,937,567 | A | * | 8/1999 | Elkins | 43/21.2 |
| 6,055,732 | A | | 5/2000 | Hu | 30/102 |
| 6,401,340 | B1 | | 6/2002 | King | 30/102 |
| 6,412,179 | B1 | | 7/2002 | Ende | 30/374 |
| 6,430,815 | B1 | | 8/2002 | Wickline | 30/101 |
| 6,484,409 | B2 | | 11/2002 | Campbell et al. | 30/371 |
| 6,487,813 | B2 | * | 12/2002 | Baynard et al. | 43/21.2 |
| 6,658,739 | B1 | | 12/2003 | Huang | 30/96 |
| 6,691,417 | B2 | | 2/2004 | Campbell et al. | 30/371 |
| D490,690 | S | | 6/2004 | Brass et al. | D8/354 |
| 6,829,830 | B2 | | 12/2004 | O'Banion | 30/371 |
| D502,638 | S | | 3/2005 | Winig et al. | D8/71 |
| 7,040,602 | B1 | * | 5/2006 | Williams | 254/30 |
| D527,621 | S | * | 9/2006 | Russell | 239/754 |

* cited by examiner

*Primary Examiner*—Kimberly T. Wood
(74) *Attorney, Agent, or Firm*—Kenneth L. Green; Edgar W. Averill, Jr.

(57) ABSTRACT

A pipe holder comprises a handle and a slant piece. The slant piece includes a handle attachment point, a mouth, and a support point. A centerline runs through the mouth and support point. The handle attachment point resides between the mouth and support point, and is configured to point the handle approximately orthogonal to the slant piece centerline. The mouth is sized and shaped to urge a pipe to reside in the mouth substantially orthogonal to the handle and at an angle other than 90 degrees from a plane of the slant piece. When an inserted end of the pipe is inserted through the mouth, a three point stance is formed by the support point, an opposite end of the pipe, and a support end of the handle. The inserted end of the pipe is thereby supported above the ground. The pipe holder is stabilized by stepping on the handle.

19 Claims, 5 Drawing Sheets

HANDS FREE PIPE HOLDER

BACKGROUND OF THE INVENTION

The present invention relates to tools for holding material and in particular to a simple tool for hands free holding of pipes.

Often, pipes and other materials must be held for cutting and other tasks. These tasks are often difficult to perform if one hand is required to hold the material during performance of the task. Tools, for example tripod pipe holders, are available for clamping a pipe to allow both hands to control a saw or other tool being used on the pipe. Unfortunately, such know pipe holders are bulky and expensive. As a result, a worker may wish to avoid moving or purchasing such pipe holder. Further, the cost of a tripod pipe holder is generally outside a budget of a homeowner for private use.

BRIEF SUMMARY OF THE INVENTION

The present invention addresses the above and other needs by providing a pipe holder which comprises a handle and a slant piece. The slant piece includes a handle attachment point, a mouth, and a support point. A centerline runs through the mouth and support point. The handle attachment point resides between the mouth and support point, and is configured to point the handle approximately orthogonal to the slant piece centerline. The mouth is sized and shaped to urge a pipe to reside in the mouth substantially orthogonal to the handle and at an angle other than 90 degrees from a plane of the slant piece. When an inserted end of the pipe is inserted through the mouth, a three point stance is formed by the support point, an opposite end of the pipe, and a support end of the handle. The inserted end of the pipe is thereby supported above the ground. The pipe holder is stabilized by stepping on the handle.

In accordance with one aspect of the invention, there is provided a workpiece support comprising a slant piece and a handle. The slant piece comprises a small end defining a first support point, a large end defining a second support point, a small mouth residing proximal to the small end, and a large mouth residing proximal to the large end. The small mouth accepts smaller cross-section workpieces and the large mouth accepts larger cross section workpieces. A slant piece centerline substantially bisects the small mouth and the large mouth and a handle attachment resides between the small mouth and the large mouth. A handle is attached to the slant piece at the handle attachment and extends away from the slant piece at an angle substantially orthogonal to the slant piece centerline.

In accordance with another aspect of the invention, there is provided a method for hands free holding of a pipe in a pipe holder comprising a slant piece and a handle attached to the slant piece. The method comprises inserting an end of the pipe through a mouth in the slant piece, positioning a support point of the slant piece, an opposite end of the pipe, and an end of the handle, on a substantially horizontal surface, and placing a foot on the handle.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1:
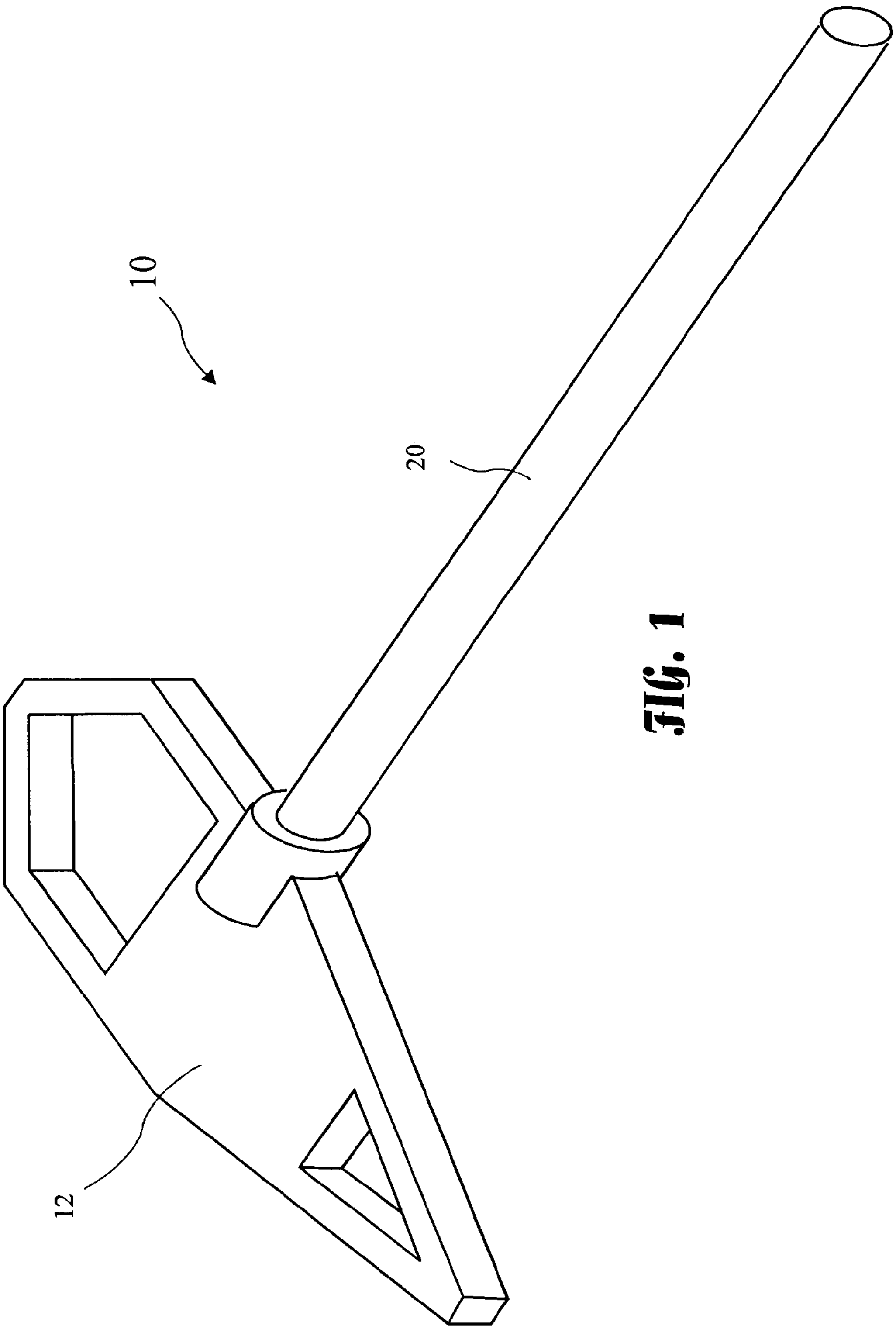
FIG. 1 is perspective view of a workpiece holder according to the present invention.

A perspective view of a workpiece (or pipe) holder 10 according to the present invention is shown in FIG. 1. There is often a need to hold a workpiece when cutting, shaping, filing, threading, etc. one end of the workpiece. These tasks are often performed on a work site, or on a piece of material difficult to carry into a garage or shop to clamp into a vice or to a workbench. A known alternative is to use a tripod holder at the work site, but such tripod holders are expensive and cumbersome to move about. The workpiece holder 10 provides a simple and easy to use solution for hands free holding of a workpiece.

Figures 2A, 2B, 2C:
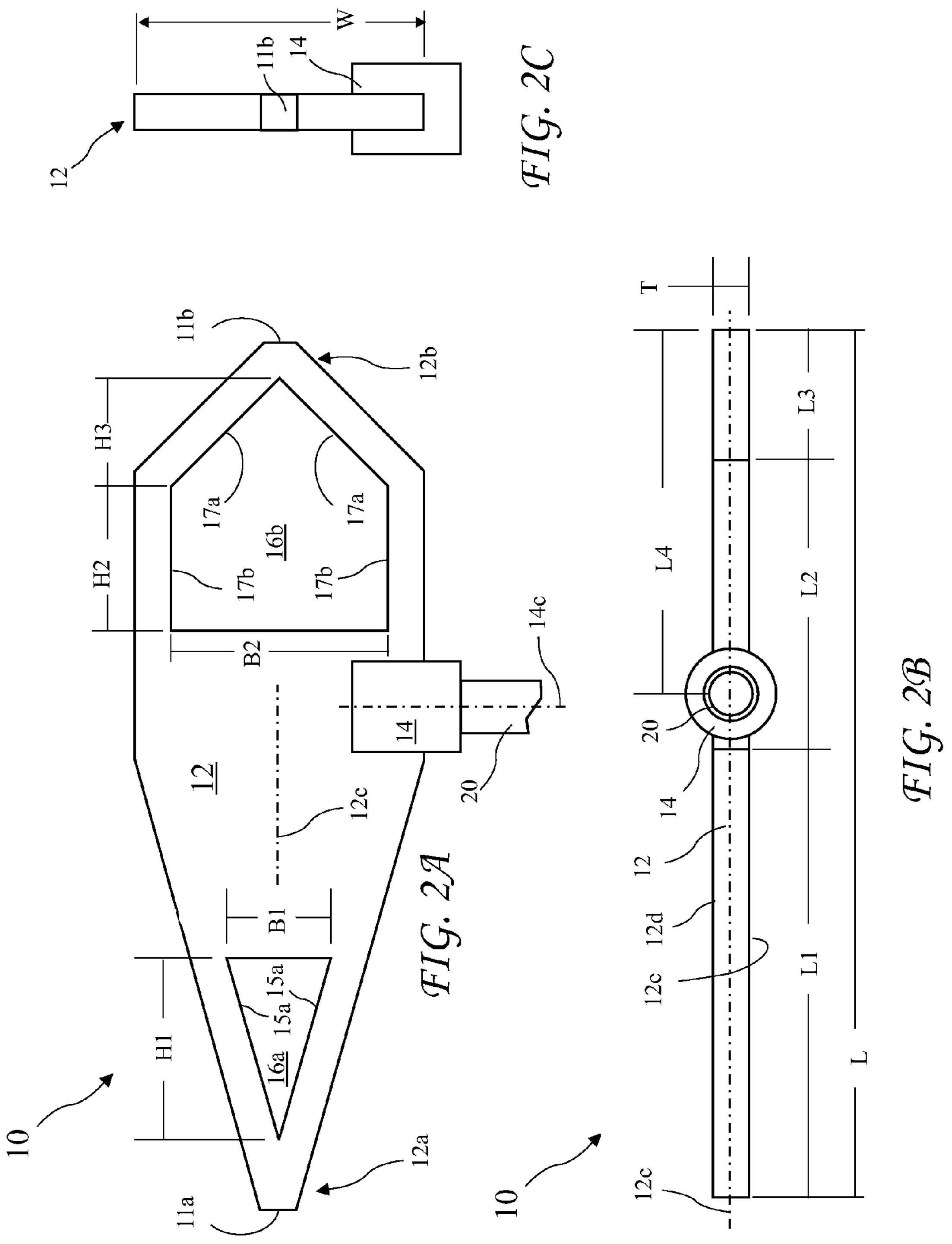
FIG. 2A is a top view of a slant piece and an attached handle of the workpiece holder.
FIG. 2B is a side view of the slant piece and the attached handle of the workpiece holder.
FIG. 2C is an end view of the slant piece and the attached handle of the workpiece holder.

A top view of a slant piece 12 and an attached handle 20 of the workpiece holder 10 is shown in FIG. 2A, a side view of the slant piece 12 and the attached handle 20 of the workpiece holder 10 are shown in FIG. 2B, and an end view of the slant piece 12 and the attached handle 20 are shown in FIG. 2C. The slant piece 12 has a length L, a width W, and a thickness T. The length L is preferable approximately 12 inches, the width W is preferably approximately four inches, and the thickness T is preferably approximately one-half inch. The slant piece 12 includes top surface 12*d* and bottom surface 12*e*.

The slant piece 12 includes a small end 12*a* and the large end 12*b*. A first support point 11*a* resides at the small end 12*a* of the slant piece 12, and a second support point 11*b* resides at the large end 12*b* of slant piece 12. The support points 11*a* and 11*b* are preferably approximately one half inch wide. The slant piece 12 has a first tapered portion with length L1 at the small end 12*a*, a uniform width center portion with length L2, and a second tapered portion with length L3 at the large end 12*b*. The length L1 is preferably approximately 6.25 inches, the length L2 is preferably four inches, and the length L3 is preferably 1.75 inches. The first tapered portion preferably tapers at approximately 16 degrees, and the second tapered portion preferably tapers at approximately 45 degree.

A small mouth 16*a* resides proximal to the small end 12*a*, and a large mouth 16*b* resides proximal to the large end 12*b*. The small mouth 16*a* includes two grasping sides 15*a* converging symmetrically about the slant piece centerline 12*c* and converging opposite the support point 11*b*, and is preferably substantially triangular in shape and preferably points (or narrows) towards the small end 12*a*. The small mouth 16*a* is preferably substantially triangular to the extent that when a workpiece (for example a pipe) 18 is inserted through the small mouth 16*a* and allowed to come to a rest position (see FIG. 3B), the workpiece 18 contacts the slant piece 12 at three points (e.g., on the base and two sides of a triangle.) The small mouth 16*a* has a base B1 and a height H1. The base B1 is preferably approximately 1.4 inches, and the height H1 is preferably approximately 2.5 inches. The small mouth 16*a* may alternatively be described as an approximately isosceles triangle with interior angles of approximately 32 degrees, approximately 74 degrees, and approximately 74 degrees and a height of approximately 2.5 inches.

The large mouth 16*b* includes two grasping sides 17*a* converging symmetrically about the slant piece centerline 12*c* and converging opposite the support point 11*a*, and is preferable a substantially pentagonal in shape and preferably points (or narrows) toward the large end 12*b*. The large mouth 16*b* is preferable substantially pentagonal to the extent that when a workpiece 18 is inserted through the large mouth 16*b* and rests in the slant piece 12, the workpiece 18 contacts the large mouth 16*b* at three points, e.g., the base and two sides 17*a* of a roof of the pentagon. The large mouth 16*b* has a base with a width B2, sides 17*b* with height H2, and roof sides 17*a* (or roof) with height H3. The base width B2 is preferably approximately three inches, the side height H2 is preferably approximately two inches, and the roof height H3 is preferably approximately 1.5 inches, thus the mouth 16*b* preferably has a height of approximately 3.5 inches. The sides 17*b* of large mouth 16*b* are preferably parallel. The large mouth 16*b* may alternatively be described as an approximately isosceles pentagon with interior angles of approximately 90 degrees (at the peak or corner pointed toward the large end 12*b*), approximately 45 degrees, approximately 45 degrees, approximately 90 degrees, and approximately 90 degrees, and a base of approximately three inches and a height of approximately 3.5 inches.

The exterior shape of the slant piece 12 preferably matches (e.g., has edges substantially parallel to) the sides of the small mouth 16*a* at the small end 12*a*, and the large mouth 16*b* at the large end 12*b*, and preferably describes an approximately one half inch border along the sides of the small mouth 16*a*and along the sides 17*b* and roof 17*a* of the large mouth 16*b*. Thus, the slant piece 12 preferably has a constant width center section of width W of preferably approximately four inches and length of preferably approximately four inches, and tapers from the center section at angles of preferably approximately 16 degrees towards the small end 12*a* over a length of preferably approximately 6.25 inches, and tapers from the center section at angles of preferably approximately 45 degrees towards the large end 12*b* over a length of preferably approximately 1.75 inches. The slant piece 12 further defines a slant piece centerline 12*c* preferably approximately centered on the slant piece 12, and alternatively running between the small mouth 16*a* and the large mouth 16*b*, or running between the small mouth 16*a* and the second support point 11*b*, or running between the large mouth 16*b* and the first support point 11*a*.

A handle attachment 14 is attached to the slant piece 12 to allow the removable attachment of the handle 20 The handle attachment 14 preferable includes female threads to accept a threaded handle attached end 20*a* (see FIG. 3A), and more preferably includes female pipe threads, and most preferably includes ¾ inch female pipe threads. The handle attachment 14 resides between the mouths 16*a* and 16*b*, and is centered a length L1 from the second support point 11*b*, wherein L1 is preferably approximately five inches. The handle attachment is aligned to point the handle 20 substantially orthogonal to the centerline 12*c*. The handle 20 is sufficiently orthogonal to the centerline 12*c* to provide a stable three point stance (see FIG. 3A) for the workpiece holder 10 and workpiece 18.

While the workpiece holder 10 is shown herein as having two mouths 16*a* and 16*b*, a workpiece hold according to the present invention may have a single mouth and single support point opposite the single mouth. The slant piece 12 may be made from plastic for use with light material, for example sprinkler line, or may be made from a metal, and is preferably metal, and more preferably made from steel. The handle 20 is preferably a threaded pipe, and more preferably a ¾ inch threaded pipe.

Figure 3A:
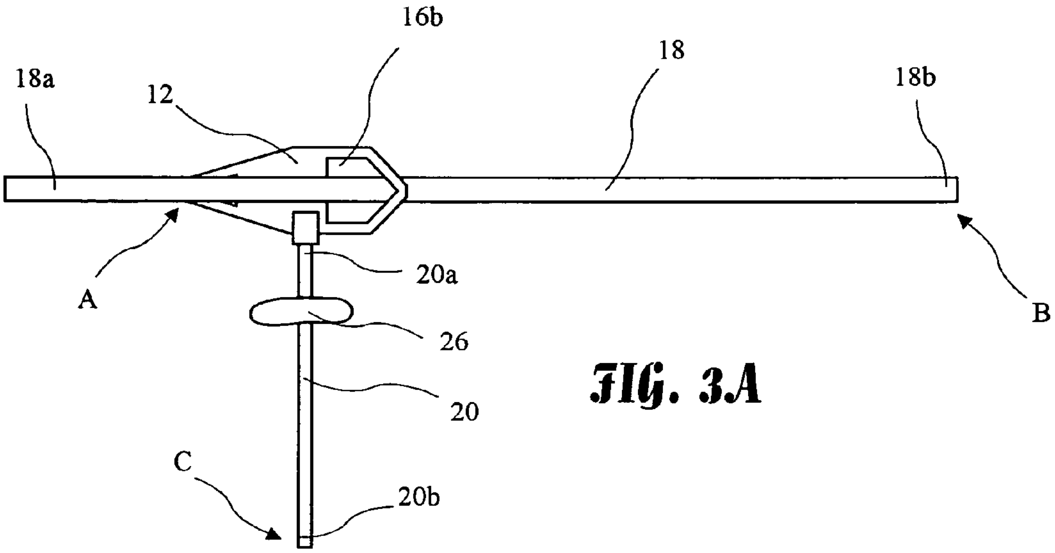
FIG. 3A depicts a top view of a workpiece held by the workpiece holder.
Figure 3B:
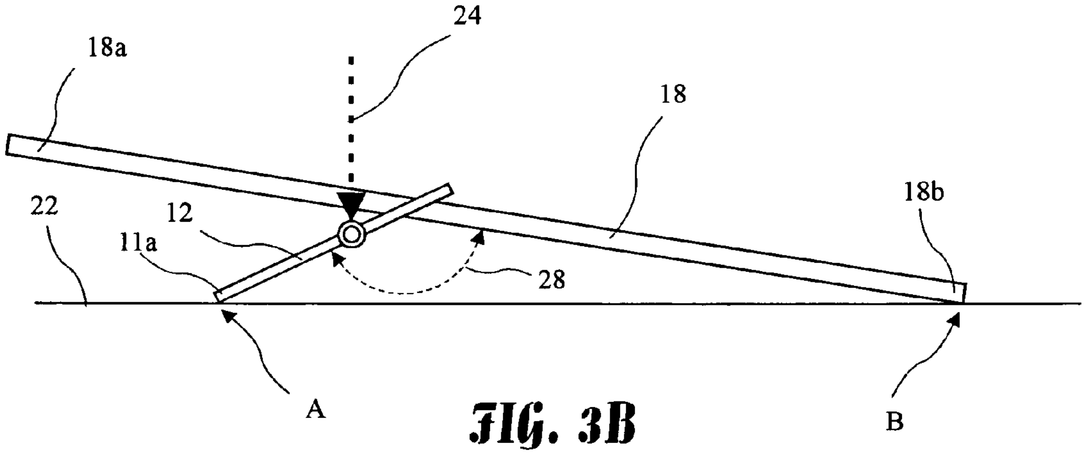
FIG. 3B depicts a side view of the workpiece held by the workpiece holder.

A top view of a workpiece 18 held by the workpiece holder 10 is shown in FIG. 3A, and a side view of the workpiece 18 held by the workpiece holder 10 is shown in FIG. 3B. An inserted end 18*a* of the workpiece 18 is inserted through the large mouth 16*b*. The workpiece holder 10 and workpiece 18 rest on points A, B, and C corresponding to the first support point 11*a*, an opposite workpiece end 18*b*, and a handle support end 20*b*. A foot 26 rests on the handle 20 exerting downward force 24 on the handle 20. The force 24 is seen to be applied at a point interior to the points A, B, and C, thereby receiving stable support from the points A, B, and C. A smaller diameter workpiece may equivalently reside in the small mouth 16*a* and be supported by the second support point 11*b*, the opposite workpiece end 18*b*, and a handle support end 20*b*.

The mouths 16*a* and 16*b* are configured so that a workpiece 18 may reside in the mouth 16*a* or 16*b* at an angle 28 to the slant piece 12. The angle 28 varies depending on the size of the mouth 16*a* or 16*b* and the cross-section of the workpiece 18, and the angle 28 is preferable large enough to provide a stable geometry for the workpiece holder 10 and workpiece 18, and to hold the inserted end 18*a* of the workpiece 18 far enough from the surface 22 to allow a desired task to be performed on the workpiece 18 (e.g., far enough to use a saw to cut off a portion of the workpiece 18.) The mouths 16*a* and 16*b* may thus vary depending on the size of workpiece 18, and the large mouth 16*b* is preferably sized to accept workpieces 18 larger than the workpieces 18 which the small mouth 16*a* is sized to accept.

Figures 4A, 4B, 4C:
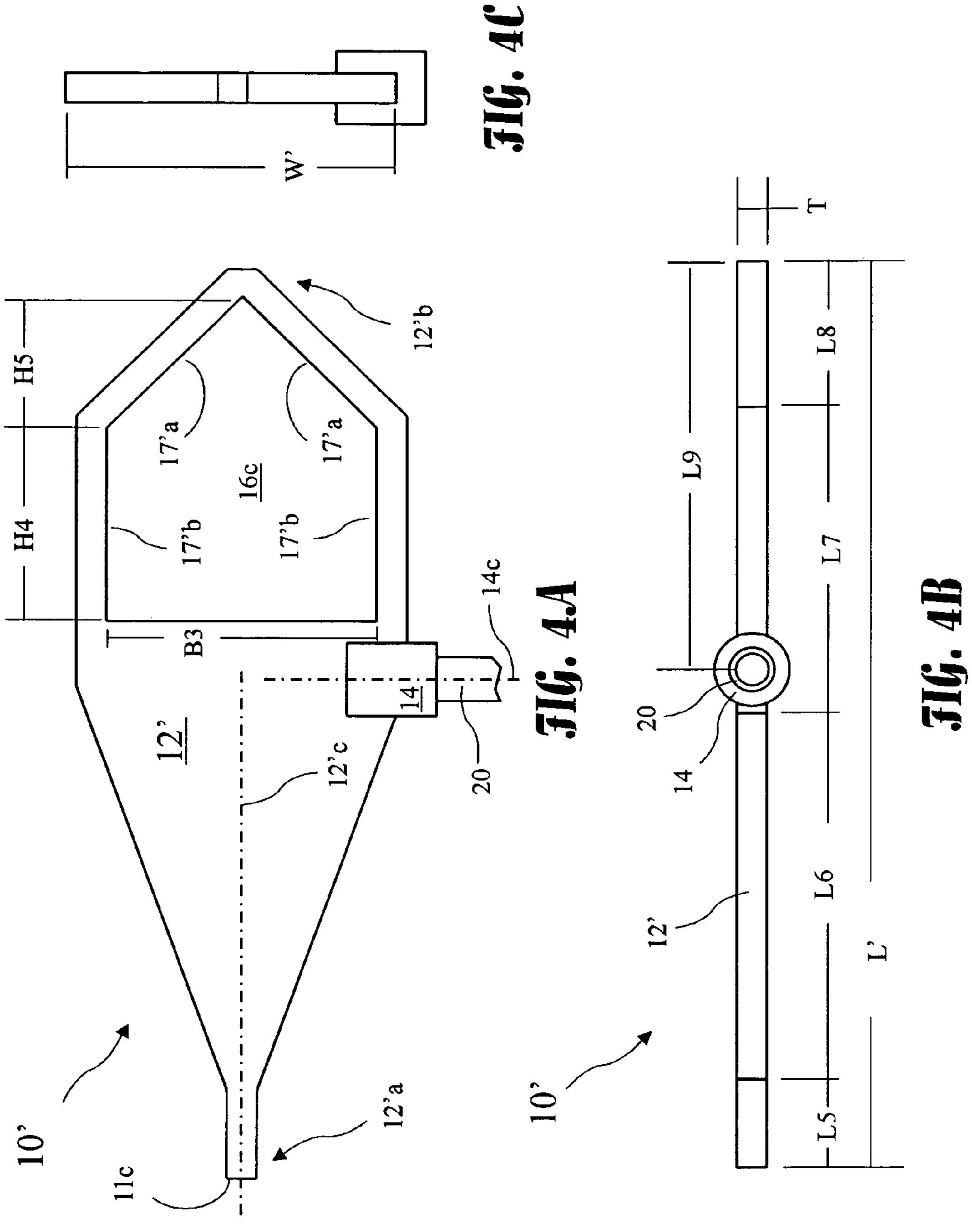
FIG. 4A is a top view of a second slant piece and an attached handle of a second workpiece holder for larger workpieces.
FIG. 4B is a side view of the second slant piece.
FIG. 4C is an end view of the second slant piece

A top view of a second slant piece 12' and an attached handle 20 of a second workpiece holder 10' for larger cross-section workpieces is shown in FIG. 4A, a side view of the second slant piece 12' is shown in FIG. 4B, and an end view of the second slant piece 12' is shown in FIG. 4C. The second slant piece 12' includes a third mouth 16*c* having a pentagonal shape similar to the second mouth 16*b* (see FIG. 2A) but which is larger than the mouth 16*b*. The third mouth 16*c* has a base B3, sides 17'*b* with length H4, and roof sides 17'*a* (or roof) with height H5. The base B3 is preferably approximately 4.5 inches, the height H4 is preferably approximately 3.3 inches, and the height H5 is preferably 2.23 inches, thus the mouth 16*c* preferably has a height of approximately 5.53 inches. The sides 17'*b* are preferably parallel and the roof sides 17'*a* are preferably slopes at approximately 45 degrees.

The second large mouth 16*c* may alternatively be described as an approximately isosceles pentagon with interior angles of approximately 90 degrees (at the peak or corner pointed toward the large end 12'*b*), approximately 45 degrees, approximately 45 degrees, approximately 90 degrees, and approximately 90 degrees, and a base of approximately 4.5 inches and a height of approximately 5.53 inches.

The slant piece 12' further has an overall length L', a width W', and a thickness T'. The length L' is preferably approximately 15.5 inches, the width W' is preferably approximately 5.5 inches, and the thickness T' is preferably approximately 0.5 inches. The third support point 11*c* resides at the end of a protruding portion with length L5 of preferably approximately 1.5 inches. The slant piece 12' has a first tapered portion with length L6 extending toward the small end 12'*a*, a uniform width center portion with length L7, and a second tapered portion with length L8 extending toward the large end 12*b*. The length L6 is preferably approximately 6.8687 inches, the length L7 is preferably 4.6313 inches, and the length L8 is preferably 2.5inches. The first tapered portion of the slant piece 12' preferably tapers at approximately 20 degrees, and the second tapered portion of the slant piece 12' preferably tapers at approximately 45 degree. The centerline 14*c* of the handle attachment 14 is preferably approximately seven inches from the large end 12'*b*.

Figure 5:
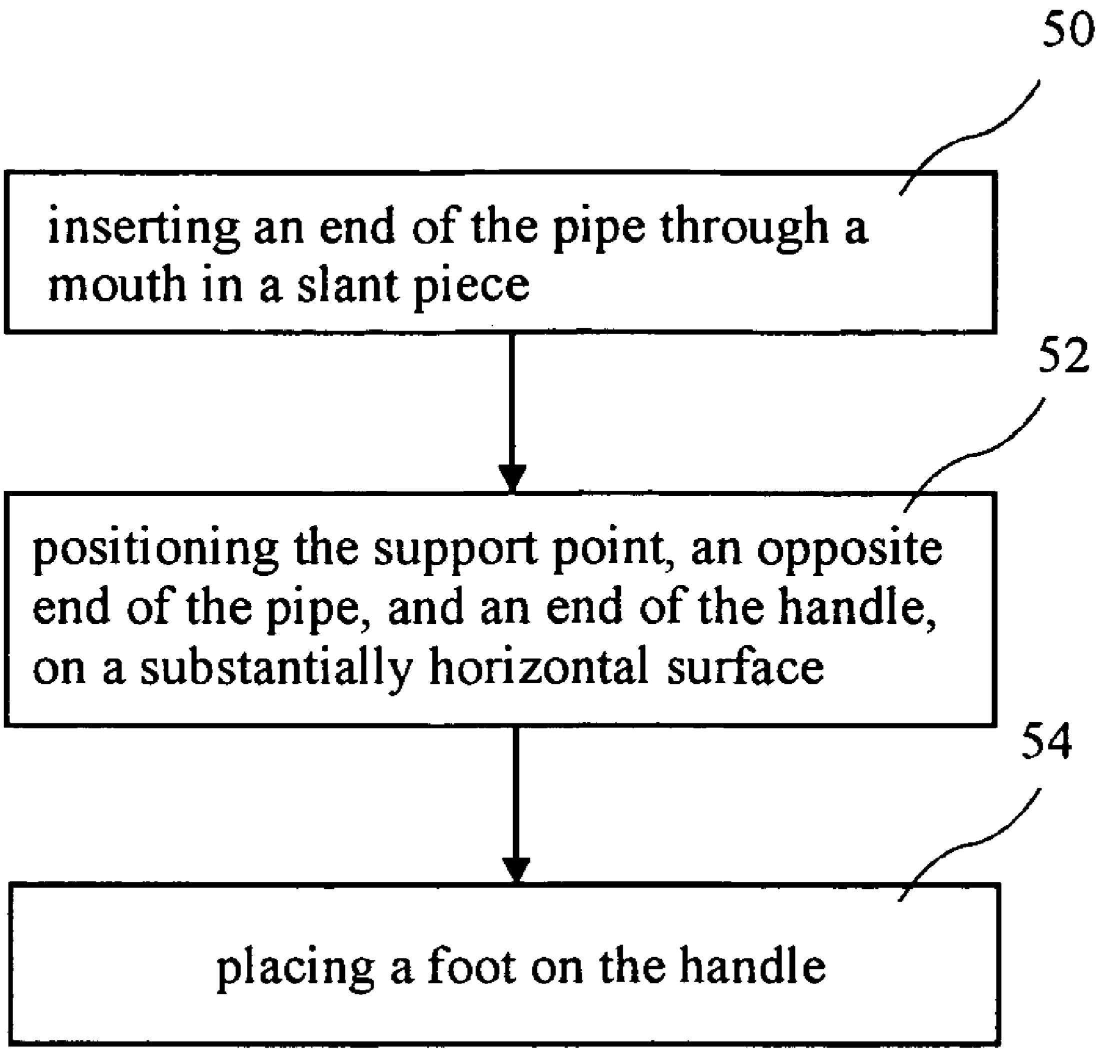
FIG. 5 is a method according to the present invention.

FIG. 5 is a method according to the present invention. The method includes the steps of inserting an end of the pipe through a mouth in a slant piece at step 50, positioning the support point, an opposite end of the pipe, and an end of the handle, on a substantially horizontal surface at step 52, and placing a foot on the handle at step 54. The method may further include inserting an end of the pipe through a mouth in a pipe holder and substantially orthogonal to the handle.

While the invention herein disclosed has been described by means of specific embodiments and applications thereof, numerous modifications and variations could be made thereto by those skilled in the art without departing from the scope of the invention set forth in the claims.

I claim:

1. A workpiece support comprising:
a slant piece including:
a first end;
a support point at the first end of the slant piece;
a slant piece length L;
a slant piece width W perpendicular to the slant piece length;
a corresponding workpiece mouth passing in a direction perpendicular to the slant piece width, through the slant piece, the workpiece mouth residing at a second end of the slant piece opposite to the support point and configured to allow the workpiece to be inserted through the workpiece mouth;
a slant piece centerline running from the support point to the workpiece mouth;
a handle attachment attached to the slant piece between the support point and the workpiece mouth; and
a handle attached to the slant piece at the handle attachment, the handle extending away from the slant piece at an angle substantially orthogonal to the slant piece centerline and extending parallel to the slant piece width,
wherein the workpiece mouth includes grasping sides converging symmetrically about the slant piece centerline converging opposite the support point.

2. The workpiece support of claim 1, wherein the grasping sides form a "V" pointing away from the support point for holding the workpiece in a plane perpendicular to the slant piece width.

3. The workpiece support of claim 2, wherein the workpiece mouth is substantially triangular in shape and the grasping sides comprise two sides of the triangle, wherein the triangle points away from the support point for holding the workpiece aligned perpendicular to the slant piece width.

4. The workpiece support of claim 3, wherein the workpiece mouth is substantially triangular in shape having a base of approximately 1.4 inches and a height of approximately 2.5 inches.

5. The workpiece support of claim 1, wherein the slant piece is made from a solid metal plate approximately one-half inches thick.

6. The workpiece support of claim 1, wherein the support point is blunt and approximately one-half inches wide.

7. The workpiece support of claim 1, wherein the slant piece centerline substantially bisects the workpiece mouth and the slant piece centerline substantially bisects the support point.

8. A workpiece support comprising:
a slant piece including:
a slant piece width W;
a slant piece length L;
a slant piece thickness T;
a slant piece centerline perpendicular to both the slant piece width and the slant piece thickness;
a support point;
a workpiece mouth passing through the slant piece at an end opposite the support point and including sides forming a "V" symmetrical about the slant piece centerline and pointing away from the support point, the "V" defining a plane parallel to both the slant piece width and the slant piece length, and configured to allow the workpiece to be inserted through the mouth, so that the workpiece tends to come to rest in a plane perpendicular to the slant piece width when the workpiece is in contact with the sides forming the "V"; and
a handle attachment between the support point and the workpiece mouth; and
a handle attached to the slant piece at the handle attachment, the handle extending away from the slant piece in the direction of the slant piece width, wherein the workpiece tends to reside in a plane perpendicular to the handle and tilted from the centerline of the slant piece when the workpiece is in contact with the sides of the workpiece mouth forming the "V".

9. A workpiece support comprising:
a flat slant piece including:
a first end;
a second end opposite the first end;
a slant piece centerline running lengthwise through the center of the flat slant piece from the first end to the second end;
a slant piece width perpendicular to the slant piece centerline and lying in a plane of the flat slant piece;
a first support point at the first end of the flat slant piece;
a corresponding first workpiece mouth opposite to the first support point and having a closed perimeter and passing through the flat slant piece and configured to allow the a workpiece to be inserted through the workpiece mouth;
a second support point at the second end of the flat slant piece;
a corresponding second workpiece mouth opposite to the second support point and having a closed perimeter and passing through the flat slant piece and configured to allow the workpiece to be inserted through the second workpiece mouth, the second workpiece mouth larger than the first workpiece mouth for accepting larger workpieces; and
a handle attachment between the first workpiece mouth and the second workpiece mouth; and
a handle attached to the flat slant piece at the handle attachment, the handle extending away from the flat slant piece in the direction parallel with the plane of the slant piece and at an angle substantially orthogonal to the flat slant piece centerline, wherein the workpiece mouths includes grasping sides converging symmetrically about the flat slant piece centerline converging opposite the respective support points.

10. The workpiece support of claim 9, wherein the grasping sides form "V"s pointing away from the respective support points.

11. The workpiece support of claim 9, wherein the first mouth is triangular in shape with a height H1 of approximately 2.5 inches and a base B1 of approximately 1.4 inches.

12. The workpiece support of claim 11, wherein the second mouth has a "V" shaped roof pointing away from the second support point and the roof has a height H3 of approximately 1.5 inches and a base B2 of approximately three inches.

13. The workpiece support of claim 1, wherein:

the slant piece includes parallel top and bottom surfaces defining a plane of the slant piece; and the handle extends parallel with the plane of the slant piece.

14. The workpiece support of claim 13, wherein the handle extends perpendicular to the slant piece centerline.

15. The workpiece support of claim 14, wherein sides of the workpiece mouth form a "V" symmetrical with the slant piece centerline and pointing away from the support point and the handle extends perpendicular to a centerline of the "V".

16. The workpiece support of claim 8, wherein:

the slant piece includes parallel top and bottom surfaces defining a plane of the slant piece; and the handle extends parallel with the plane of the slant piece.

17. The workpiece support of claim 8, wherein the slant piece is approximately ½ inch thick metal and the handle attachment is attached to the metal slant plate.

18. The workpiece support of claim 9, wherein sides of the workpiece mouths form a "V" symmetrical with the slant piece centerline and pointing away from the support point and the handle extends perpendicular to a centerline of the "V" and in a plane defined by the "V".

19. The workpiece support of claim 9, wherein the slant piece is a single piece of approximately ½ inch thick metal plate and the handle attachment fixed to the metal plate.

* * * * *